US012135061B2

(12) United States Patent
Reisenberger et al.

(10) Patent No.: US 12,135,061 B2
(45) Date of Patent: Nov. 5, 2024

(54) MULTILAYER SLIDE BEARING AND METHOD FOR PRODUCING A MULTILAYER SLIDE BEARING

(71) Applicant: Miba Gleitlager Austria GmbH, Laakirchen (AT)

(72) Inventors: Johannes Reisenberger, Ohlsdorf (AT); Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 200 days.

(21) Appl. No.: 17/613,999

(22) PCT Filed: May 28, 2020

(86) PCT No.: PCT/AT2020/060217
§ 371 (c)(1),
(2) Date: Nov. 29, 2021

(87) PCT Pub. No.: WO2020/237276
PCT Pub. Date: Dec. 3, 2020

(65) Prior Publication Data
US 2022/0221000 A1    Jul. 14, 2022

(30) Foreign Application Priority Data
May 29, 2019 (AT) ................ A 50495/2019

(51) Int. Cl.
*B21D 53/10*       (2006.01)
*B23P 15/00*       (2006.01)
(Continued)

(52) U.S. Cl.
CPC ............ *F16C 33/122* (2013.01); *B21D 53/10* (2013.01); *B23P 15/003* (2013.01); *F16C 17/10* (2013.01);
(Continued)

(58) Field of Classification Search
CPC .... B21D 53/10; B21D 39/046; B21D 39/048; B23P 15/003; Y10T 29/49803;
(Continued)

(56) References Cited

U.S. PATENT DOCUMENTS 1,331,961 A * 2/1920 Klocke .................. F16C 33/14
29/898.059
3,528,092 A   9/1970 Barkhoudarian
(Continued)

FOREIGN PATENT DOCUMENTS

AT       511 434 A4    12/2012
CH       615 853 A5    2/1980
(Continued)

OTHER PUBLICATIONS

International Search Report in PCT/AT2020/060217, dated Sep. 18, 2020.
(Continued)

*Primary Examiner* — Jermie E Cozart
(74) *Attorney, Agent, or Firm* — Collard & Roe, P.C.

(57) ABSTRACT

A method for producing a multi-layer sliding bearing includes: —providing a carrier body with a carrier body connecting surface, a surface structure being formed on the carrier body connecting surface, and the carrier body on the carrier body connecting surface having a carrier body material with a carrier body strength; —providing a bearing body with a bearing body connecting surface, the bearing body on the bearing body connecting surface having a bearing body material with a bearing body strength; —applying the bearing body to the carrier body, a carrier body connecting surface being turned towards a bearing body connecting surface; —pressing the bearing and carrier bodies together, wherein the bearing body, on the bearing body connecting surface, is plastically deformed and forms a positive locking
(Continued)

connection with the carrier body connecting surface from the effect of the surface structure of the carrier body connecting surface.

9 Claims, 6 Drawing Sheets

(51) Int. Cl.
*F16C 17/10* (2006.01)
*F16C 33/12* (2006.01)
*B21D 39/04* (2006.01)
*B23P 11/00* (2006.01)

(52) U.S. Cl.
CPC .......... *B21D 39/046* (2013.01); *B21D 39/048* (2013.01); *B23P 11/005* (2013.01); *Y10T 29/49696* (2015.01); *Y10T 29/497* (2015.01); *Y10T 29/49707* (2015.01); *Y10T 29/49803* (2015.01)

(58) Field of Classification Search
CPC ......... Y10T 29/49707; Y10T 29/49696; Y10T 29/497; F16C 33/122
See application file for complete search history.

(56) References Cited

U.S. PATENT DOCUMENTS

| | | | |
|---|---|---|---|
| 4,658,500 | A | 4/1987 | Engel et al. |
| 6,382,838 | B1 | 5/2002 | Yamada et al. |
| 6,491,437 | B1 | 12/2002 | Yamada et al. |
| 9,138,837 | B2 | 9/2015 | Kamamoto et al. |
| 9,458,880 | B2 | 10/2016 | Kari et al. |
| 10,436,249 | B2 | 10/2019 | Hoelzl |
| 2003/0093902 | A1 | 5/2003 | Hsu et al. |
| 2011/0026864 | A1 | 2/2011 | Than Trong et al. |
| 2013/0326880 | A1 | 12/2013 | Kamamoto et al. |
| 2019/0063498 | A1 | 2/2019 | Hentschke et al. |

FOREIGN PATENT DOCUMENTS

| | | | | |
|---|---|---|---|---|
| CN | 102966667 | A | 3/2013 | |
| CN | 103470637 | A | 12/2013 | |
| CN | 104128588 | A | 11/2014 | |
| CN | 108787809 | A | 11/2018 | |
| CN | 109424648 | A | 3/2019 | |
| CN | 109731982 | A | 5/2019 | |
| CN | 109790867 | A | 5/2019 | |
| DE | 10 2012 207 503 | A1 | 11/2013 | |
| DE | 102016122154 | A1 * | 5/2018 | |
| EP | 0527450 | A1 | 2/1993 | |
| EP | 2 218 929 | A2 | 8/2010 | |
| EP | 2 558 718 | B1 | 11/2016 | |
| EP | 3396187 | A1 | 10/2018 | |
| FR | 674877 | A | 2/1930 | |
| FR | 2993946 | A1 | 1/2014 | |
| GB | 1473384 | A | 5/1977 | |
| GB | 2158164 | A * | 11/1985 | ............ F16C 33/14 |
| GB | 2 332 246 | A | 6/1999 | |
| JP | S50-3262 | B1 | 2/1975 | |
| JP | H02-34289 | A | 2/1990 | |
| JP | H0587145 | A | 4/1993 | |
| JP | 108121466 | A | 5/1996 | |
| JP | H10252721 | A | 9/1998 | |
| JP | 2006329252 | A | 12/2006 | |
| JP | 2007016950 | A | 1/2007 | |
| JP | 2009236213 | A | 10/2009 | |
| RU | 2192962 | C1 | 11/2002 | |
| TW | 200831799 | A | 8/2008 | |
| WO | 01/19549 | A1 | 3/2001 | |
| WO | 2008/103122 | A1 | 8/2008 | |
| WO | 2013/110110 | A1 | 8/2013 | |
| WO | 2013/167300 | A1 | 11/2013 | |
| WO | 2016029235 | A1 | 3/2016 | |
| WO | 2018058163 | A1 | 4/2018 | |

OTHER PUBLICATIONS

International Search Report in PCT/AT2020/060216, dated Oct. 5, 2020.
"Fundamentals of Mechanical Design," Beijing Institute of Technology Press, pp. 230-231 (2017).

* cited by examiner

MULTILAYER SLIDE BEARING AND METHOD FOR PRODUCING A MULTILAYER SLIDE BEARING

CROSS REFERENCE TO RELATED APPLICATIONS

This application is the National Stage of PCT/AT2020/060217 filed on May 28, 2020, which claims priority under 35 U.S.C. § 119 of Austrian Application No. A50495/2019 filed on May 29, 2019, the disclosure of which is incorporated by reference. The international application under PCT article 21(2) was not published in English.

BACKGROUND OF THE INVENTION

1. Field of Invention

The invention relates to a method for producing a multi-layer sliding bearing.

2. Description of the Related Art

AT 511 434 A4 discloses a method for producing a multi-layer sliding bearing.

The method disclosed in AT 511 434 A4 is complex and thus the production of the multi-layer sliding bearing is difficult.

SUMMARY OF THE INVENTION

WO 2013/110110 A1 discloses a method for producing a sliding bearing comprising a sup-port layer and a sliding bearing layer, wherein the support layer is connected to the sliding bearing layer by means of roll cladding, and wherein, before the roll cladding, a surface structure is produced on the surface of the support layer, and subsequently, the sliding bearing layer is rolled onto the support layer.

Further sliding bearings are known from GB 2 332 246 A, U.S. Pat. No. 4,658,500 A, FR 674 877 A, and FR 2 993 946 A1.

The object of the present invention was to overcome the disadvantages of the prior art and to provide a method by means of which a multi-layer sliding bearing can be produced in a simplified manner.

This object is achieved by means of a device and a method according to the claims.

According to the invention, a method for producing a multi-layer sliding bearing is provided. The method comprises the method steps:
  providing a carrier body with a carrier body connecting surface, wherein a surface structure is formed on the carrier body connecting surface, and wherein the carrier body on the carrier body connecting surface has a carrier body material with a carrier body strength;
  providing a bearing body with a bearing body connecting surface, wherein the bearing body on the bearing body connecting surface has a bearing body material with a bearing body strength;
  applying the bearing body to the carrier body, wherein a carrier body connecting surface is turned towards a bearing body connecting surface;
  pressing the bearing body and the carrier body together, wherein the bearing body, on the bearing body connecting surface, is plastically deformed and forms a positive locking connection with the carrier body connecting surface due to the effect of the surface structure of the carrier body connecting surface.

The method according to the invention entails the advantage that a sufficiently firm connection can be established between the bearing body and the carrier body, so that the multi-layer sliding bearing has a high durability and moreover, is easy to produce.

Moreover, it may be provided that the bearing body strength is lower than the carrier body strength. This entails the advantage that the material of the bearing body can be fitted easily to the material of the carrier body and/or be pressed together with it.

Moreover, it may be useful if the surface structure of the carrier body connecting surface has undercuts, into which the carrier body material is pressed. By this measure, a positive locking connection between the carrier body and the bearing body can be achieved.

Moreover, it may be provided that the surface structure is produced by means of a laser.

In a further alternative variant, it may be provided that the surface structure is produced by means of a 3D printing method.

Moreover, it may be provided that the surface structure has webs, wherein the webs are deformed when the bearing body and the carrier body are pressed together. This entails the surprising advantage that the connection between the bearing body and the carrier body have an increased strength.

Furthermore, it may be provided that the webs are arranged essentially at a right angle relative to the carrier body connecting surface.

An embodiment, according to which it may be provided that, while the bearing body and the carrier body are being pressed together, the webs bend obliquely relative to their longitudinal extension, is also advantageous. Hereby, a good connection between the carrier body and the bearing body can surprisingly be achieved.

According to an advancement, it is possible that in a web head, the webs have a cross-sectional width of the head, and that at a web base, the webs have a cross-sectional width of the base, wherein the cross-sectional width of the head is greater than the cross-sectional width of the base.

Furthermore, it may be useful if the surface structure of the carrier body connecting surface is produced by means of cross-hatched knurling or left-right-hand knurling. Surprisingly, the method of cross-hatched knurling or left-right-hand knurling and/or the surfaces produced thereby entail an increased stability between the bearing body and the carrier body compared to all other surface structures or smooth surfaces. Such knurling methods are standardized in DIN 8583-5, DIN 82, DIN 403. In particular, the following designations may be used for the aforementioned types of knurling according to the standard: RGE: left-right knurl, points raised (fish skin); RGV: left-right-hand knurl, points indented; RKE: cross-hatched knurl, points raised; RKV: cross-hatched knurl, points indented.

In knurling, a difference is made between the non-cutting knurl rolling and the machining knurl-cutting. Depending on the method, the profile is indented by knurling wheels or cut on a knurling milling machine. Using CNC lathes with driven tools, it is also possible to use special knurling milling tools to avoid rechucking to different machines. As the processing forces in milling are lower, this method is mostly used for thin workpieces or on machining centers. In a further embodiment, it is also conceivable that the described structure is produced on rotationally symmetrical workpieces by means of a lathe tool and/or by means of a turning method, wherein this turning method may be carried out similarly to reaming. In this regard, left-right-handed knurling may be realized by a left-hand thread and a right-hand thread.

Particularly the surfaces described above, produced by cross-hatched knurling or left-right-hand knurling, in connection with a carrier body connecting surface and bearing body connecting surface designed to be cylindrical or in the form of a cylinder segment entail a particularly improved stability between the carrier body and the bearing body.

Moreover, it is also conceivable that the carrier body is designed in the form of a pin segment or any other cylinder segment or hollow cylinder segment, which is formed of a solid material without cavities or through-bores. In such embodiments, the surprising advantages described in the previous paragraph are also achieved.

In particular, it is conceivable that the bearing body is designed as a main rotor bearing of a wind turbine. In this case, the bearing body and the carrier body may have a segmented design. Such bearing segments are disclosed in EP2558718B1, the contents of which are included by way of reference.

Furthermore, it may be provided that the surface structure of the carrier body connecting surface is produced using mechanical processing. Especially in the case of large components, this allows producing surface structures having a good component strength.

Moreover, it may be provided that the bearing body and the carrier body are pressed together by means of a magnetic force generator, which applies a magnetic force to the bearing body, wherein the bearing body is pressed onto the carrier body by means of the magnetic force generator. This entails the surprising advantage that the connection quality between the carrier body and the bearing body can be increased and, beyond that, the connection between the two bodies can be established easily.

Moreover, it may be provided that before and/or while the bearing body and the carrier body are pressed together, the bearing body and/or the carrier body are heated above room temperature. This entails the advantage that stresses in the material are reduced. Additionally, this measure entails a reduction of the thermal expansion in operating conditions. In particular, for aluminum materials can be heated to between 350° C. and 430° C. Steel materials can be heated to between 550° C. and 650° C.

Moreover, it is conceivable that the bearing body and the carrier body are heated to the same temperature which is between −70° C. and 350° C.

According to a particular embodiment, it is possible that the magnetic force generator comprises a coil admitted with current, wherein an electromagnetic force is applied to the bearing body by means of the coil. Particularly by means of a magnetic force generator designed like this, a magnetic force can easily be applied to the bearing body.

Moreover, it can be useful if the carrier body connecting surface and the bearing body connecting surface are designed to be cylindrical. This entails the advantage that, upon deformation of the bearing body, a clamping of the bearing body on the carrier body can be achieved due to the cylindrical geometry.

Moreover, it may be provided that a pin is provided as the carrier body, wherein the bearing body is pushed externally onto the carrier body. The carrier body may, in particular, be a pin of a planetary gearbox of a wind turbine.

Moreover, it may be provided that the surface structure of the carrier body connecting surface has a cross-hatched knurl or a left-right-hand knurl.

Moreover, it may be provided that a sliding surface is formed on the bearing body, which sliding surface has an axial bearing region and a radial bearing region. A bearing body, which simultaneously serves the axial bearing and the radial bearing, entails the surprising advantage that such a sliding bearing may run very smoothly with a low error-proneness. Particularly if a bearing body designed like this is placed on a carrier body by means of a magnetic force generator, a high precision of the combined axial bearing and radial bearing can be achieved. For the functionality of the combined axial bearing and radial bearing, it may be advantageous if, simultaneously, the surface structure of the carrier body connecting surface has a cross-hatched knurl or a left-right-hand knurl.

An embodiment, according to which it may be provided that the magnetic force generator has a hollow-cylindrical design, wherein the magnetic force generator is arranged radially on the outside of and around the bearing body for deforming the bearing body, is also advantageous Such a structure allows bearing bodies, which are arranged externally around the carrier body, to be easily pressed onto the carrier body.

In an alternative embodiment variant, it may also be provided that the carrier body has a hollow-cylindrical design, and the bearing body is arranged inside the carrier body, wherein the magnetic force generator is arranged inside the bearing body. In this exemplary embodiment, a force having a radially outward effect is applied to the bearing body by means of the magnetic force generator, whereby the bearing body is pushed radially outward.

Moreover, it may be useful if, during the deformation of the bearing body, a voltage is applied to the bearing body by means of a first electrode attached to the bearing body and a second electrode attached to the bearing body, or the first electrode and the second electrode are short-circuited. This entails the advantage that the magnetic force applied to the bearing body by means of the magnetic force generator can be increased.

Moreover, it may be provided that the bearing body is formed of a paramagnetic bearing body material, a ferromagnetic bearing body material, or a diamagnetic bearing body material. Particularly bearing bodies which are formed of such a material are designed to be easily deformable by means of the magnetic force.

In particular, it may be provided that the bearing body is made of an aluminum-tin alloy. Aluminum-based bearing bodies may be formed, e.g. by AlSn40, AlSn20, AlSn25, AlSn10, AlSn6, etc.

As an alternative thereto, it may be provided that the bearing body is made of a copper-tin alloy. Usable copper-based bearing metals would be, for example CuPb22Sn2, CuPb10Sn10, CuPb15Sn7, CuSn6, CuSn4 Zn1. In particular, unleaded copper alloys based on CuAl, CuSn, CuZn, CuSnZn, CuZnSn, and CuBi are advantageous with respect to a lower environmental impact.

Moreover, it may be provided that the bearing body is made of the material CuSn5. In tests, it has become apparent that when using a bearing body made from this material, the method according to the invention can be carried out surprisingly efficiently. In particular, a surprisingly high strength of the connection between the bearing body and the carrier body can be achieved compared to bearing bodies made from a different material.

Additionally, it may be provided that the bearing body has a copper base alloy, wherein the copper base alloy contains between 0.1 wt. % and 3 wt. % sulfur, between 0.01 wt. % and 4 wt. % iron, between 0 wt. %, in particular 0.001 wt.

%, and 2 wt. % phosphorus, at least one element from a first group consisting of zinc, tin, aluminum, manganese, nickel, silicon, chromium and indium of in total between 0.1 wt. % and 49 wt. %, wherein the proportion of zinc amounts to between 0 wt. % and 45 wt. %, the proportion of tin amounts to between 0 wt. % and 40 wt. %, the proportion of aluminum amounts to between 0 wt. % and 15 wt. %, the proportion of manganese amounts to between 0 wt. % and 10 wt. %, the proportion of nickel amounts to between 0 wt. % and 10 wt. %, the proportion of silicon amounts to between 0 wt. % and 10 wt. %, the proportion of chromium amounts to between 0 wt. % and 2 wt. %, and the proportion of indium amounts to between 0 wt. % and 10 wt. %, and at least one element from a second group consisting of silver, magnesium, cobalt, titanium, zirconium, arsenic, lithium, yttrium, calcium, vanadium, molybdenum, tungsten, antimony, selenium, tellurium, bismuth, niobium, palladium each to a proportion of between 0 wt. % and 1.5 wt. %, wherein the summary proportion of the elements of the second group amounts to between 0 wt. % and 2 wt. %, and the balance adding up to 100 wt. % being constituted by copper and impurities originating from the production of the elements. The method according to the invention can be applied surprisingly well on a bearing body having such a composition, so that a surprisingly good connection between the bearing body and the carrier body can be achieved.

In a further alternative variant, it may be provided that the bearing body comprises a plastic material, in particular a polymeric material.

Moreover, it may be provided that prior to the deforming of the bearing body, the bearing body connecting surface is arranged at a distance from the carrier body connecting surface, and that the bearing body is accelerated in the direction of the carrier body by means of the magnetic force generator, so that the bearing body connecting surface hits the carrier body connecting surface with an impact velocity of between 10 m/s and 1000 m/s, in particular between 100 m/s and 600 m/s, preferably between 250 m/s and 400 m/s. Particularly a bearing body accelerated to such a velocity can enter a sufficiently strong and durable connection with the carrier body without the surface of the bearing body or of the carrier body having to be prepared separately. Thus, a deformation of the bearing body and/or of the carrier body sufficient for achieving a materially bonded connection or a positive locking connection between these two bodies can be achieved by the collision energy alone.

According to a particular embodiment, it is possible that a current surge of limited duration is released into the coil admitted with current. Thereby, the current surge can have an increased current strength without causing the coil to overheat.

In particular, it may be provided that a capacitor is charged, which provides the energy for the current surge of limited duration and can release the required amount of energy for the current surge within a short time.

According to an advantageous advancement, it may be provided that the current surge has a current strength of between 10 kA and 800 kA, in particular between 50 kA and 600 kA, preferably between 300 kA and 480 kA. Especially with such a current strength, a sufficiently strong magnetic force can be generated for being able to deform the bearing body.

In particular, it may be provided that the energy generated in the coil amounts to between 2 kJ and 250 kJ, in particular between 10 kJ and 150 kJ, preferably between 40 kJ and 60 kJ.

Moreover, it may be provided that the current in the coil has a frequency of between 1 kHz and 100 kHz, in particular between 5 kHz and 50 kHz, preferably between 15 kHz and 30 kHz.

In particular, it may be advantageous if the magnetic force generated by the magnetic force generator acts on the bearing body in a locally limited section. By this measure, the magnetic force acting on the limited section of the bearing body in a localized manner can be increased. Moreover, it may be provided that a coil admissible with current is formed, which is designed for applying a deformation force to the bearing body.

According to the invention, a sliding bearing production device is formed. The sliding bearing production device comprises a holding device for holding a carrier body and/or a bearing body. Moreover, a coil admissible with current is formed, which is designed for applying a deformation force to the bearing body.

A multi-layer sliding bearing within the meaning of this document is a sliding bearing, which comprises at least two layers, namely a carrier body and a bearing body. In particular, it is provided that the carrier body and the bearing body are formed of different materials. The bearing body and/or the carrier body itself may have further layers made of different materials.

The cross-sectional width of the head can amount to between 0.1 mm and 30 mm, in particular between 0.5 mm and 10 mm, preferably between 1 mm and 6 mm.

The cross-sectional width of the base can be between 0.01 mm and 10 mm, in particular between 0.1 mm and 3 mm, preferably between 0.4 mm and 2 mm, smaller than the cross-sectional width of the head.

Moreover, it may be provided that the bearing body is produced by means of a casting method, in particular by means of a belt casting method. This entails the advantage that the material of the bearing body can be selected such that it has the best possible sliding bearing properties. In particular, such a casting method allows casting homogeneously structured alloys. In particular, by means of this casting method, an oblong rod can be produced, from which the individual bearing bodies of individual multi-layer sliding bearings can be produced.

Furthermore, it may be provided that the bearing body is produced by a continuous casting method, for example in the form of a pipe continuous casting. Bearing bodies with copper materials, in particular, can be produced easily according to this method.

Furthermore, it may be provided that the carrier body and/or the bearing body are at least partially designed as a flat product, wherein particularly the sliding surface is designed as a flat surface. The method according to the invention entails the surprising advantage that even with flat products, a sufficiently firm connection can be established between the carrier body and the bearing body.

Of course, it may moreover be provided that the carrier body has a cylindrical or hollow-cylindrical design, and that the bearing body is designed as a cylinder segment. A bearing body formed as a cylinder segment can also be connected to the carrier body with a sufficient strength by means of the method according to the invention, surprisingly without any additional provisions.

Furthermore, it may be provided that the carrier body has a shaped element, such as a groove, on its carrier body connecting surface, wherein the bearing body, during its deformation, is pressed into the shaped element, so that a sliding surface of the bearing body has a shaping fitted to the shaped element. This entails the advantage that shaped elements desired in the sliding surface of the bearing body, such as lubricant grooves, can be easily introduced. In this regard, it may be provided that the magnetic force generator applies an increased force effect to the bearing body in the region of these shaped elements, so that the bearing body can be pressed into the shaped elements formed in the bearing body as well as possible. Furthermore, it is also conceivable that multiple individual shaped elements, for example individual small pockets, are formed in the carrier body, which shaped elements can be used, for example, for providing individual lubricant cushions on the sliding surface of the bearing body, when in the joined state.

Moreover, it is conceivable that the rods cast by means of the above casting method are cut to length in order to produce bearing bodies therefrom.

According to the invention, a multi-layer sliding bearing is provided. The multi-layer sliding bearing comprises:
- a carrier body with a carrier body connecting surface, wherein a surface structure is formed on the carrier body connecting surface, and wherein the carrier body on the carrier body connecting surface has a carrier body material with a carrier body strength;
- a bearing body with a bearing body connecting surface, wherein the bearing body on the bearing body connecting surface has a bearing body material with a bearing body strength, wherein the bearing body is applied to the carrier body, wherein a carrier body connecting surface faces a bearing body connecting surface and wherein the bearing body, on the bearing body connecting surface, is plastically deformed into the surface structure of the carrier body connecting surface and forms a positive locking connection with the carrier body connecting surface.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
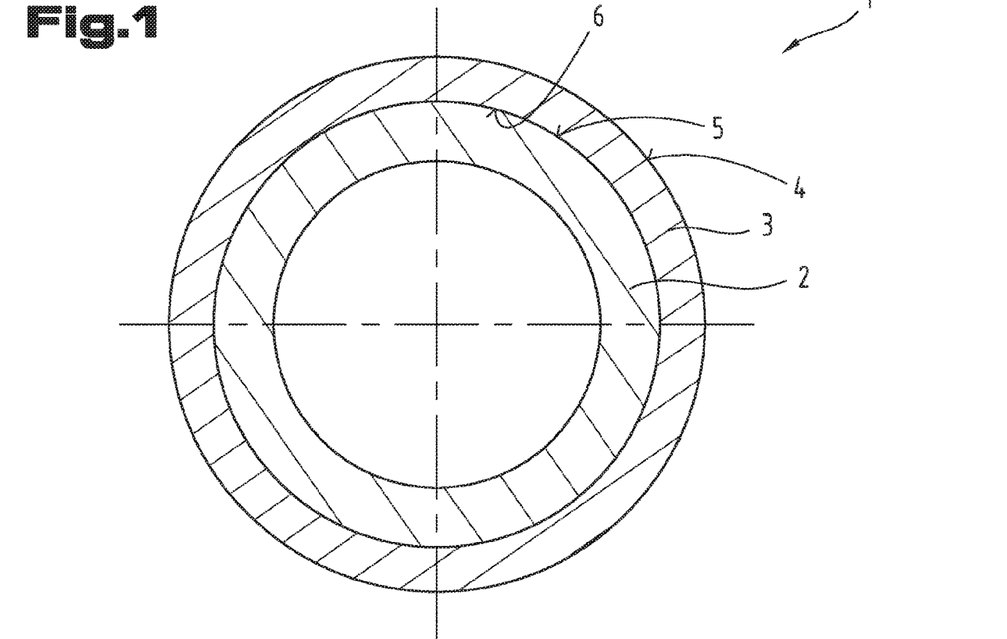
FIG. 1 a schematic sectional view of a first exemplary embodiment of a multi-layer sliding bearing with a cylindrical sliding surface.

FIG. 1 shows a schematic representation of multi-layer sliding bearing 1.

As can be seen from FIG. 1, the multi-layer sliding bearing 1 comprises at least one carrier body 2 and one bearing body 3. The carrier body 2 serves to provide the multi-layer sliding bearing 1 with the necessary stability. A sliding surface 4 is formed on the bearing body 3. The carrier body 2 has carrier body connecting surface 5, which, in the operational state of the multi-layer sliding bearing 1, abuts on a bearing body connecting surface 6 of the bearing body 3.

Moreover, it is also conceivable that the carrier body 2 and/or the bearing body 3 are built from multiple individual layers with different material compositions. In particular, it may be provided that the bearing body 3 has a surface coating, for example, in the region of the sliding surface 4.

As can be seen from FIG. 1, it may be provided that the carrier body 2 and the bearing body 3 have a cylindrical or hollow-cylindrical design, and the carrier body connecting surface 5 and the carrier body connecting surface 6 have a cylindrical surface.

In this regard, it may be provided that the carrier body 2 is arranged inside the carrier body 3; in particular, it may be provided here that the carrier body connecting surface 5 is formed on the outer jacket of the carrier body 2, and that the bearing body connecting surface 6 is formed on the inner jacket of the bearing body 3. In particular, it can be provided that the carrier body 2 and the bearing body 3 are arranged coaxially relative to one another.

In a further exemplary embodiment that is not shown, it may also be provided that the carrier body 2 is designed as a solid-cylindrical body, for example in the form of a pin.

In a further exemplary embodiment that is not shown, it may be provided that the bearing body 3 is arranged on the inside of the carrier body 2, wherein the sliding surface 4 is formed on the inner lateral surface of the bearing body 3.

A multi-layer sliding bearing 1 as shown in FIG. 1 serves for rotatory bearing of two component relative to one another.

Figure 2:
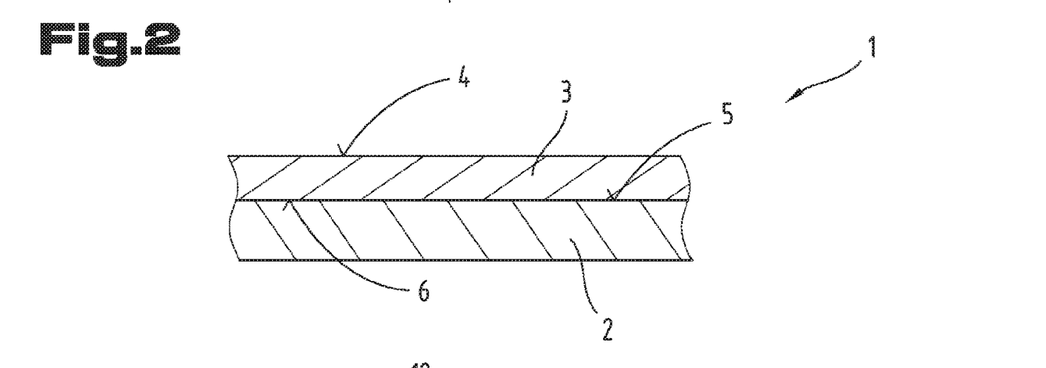
FIG. 2 a schematic sectional view of a second exemplary embodiment of a multi-layer sliding bearing with a flat sliding surface.

FIG. 2 shows a further and possibly independent embodiment of the multi-layer sliding bearing 1, wherein again, equal reference numbers/component designations are used for equal parts as before in FIG. 1. In order to avoid unnecessary repetitions, it is pointed to/reference is made to the detailed description in FIG. 1 preceding it.

FIG. 2 shows a further exemplary embodiment of the multi-layer sliding bearing 1. As can be seen from FIG. 2, it may be provided that the carrier body 2 and/or the bearing body 3 are at least partially designed flat. In particular, it may be provided that the sliding surface 4 forms a flat surface. Moreover, it may be provided that the carrier body connecting surface 5 and the bearing body connecting surface 6 also form a flat surface, in which they are connected to one another. A thus formed multi-layer sliding bearing 1 may be used, for example, as a linear bearing.

Moreover, it is also conceivable that the multi-layer sliding bearing 1 is designed in the form of a bearing pad.

Figure 3:
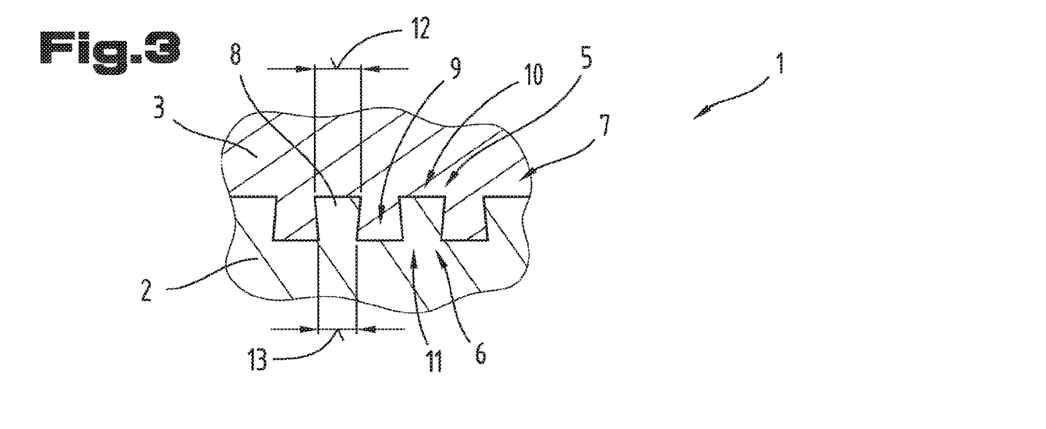
FIG. 3 a detailed view of a surface structure of a multi-layer sliding bearing.

In FIG. 3, a further and possibly independent embodiment of the multi-layer sliding bearing 1 is shown, wherein again equal reference numbers and/or component designations are used for equal parts as in the preceding FIGS. 1 and 2. In order to avoid unnecessary repetitions, it is pointed to/reference is made to the detailed description in FIGS. 1 and 2 preceding it.

FIG. 3 shows, in a sectional view, a first exemplary embodiment of a connection between the carrier body connecting surface 5 and the bearing body connecting surface 6 in detail. In this exemplary embodiment, the carrier body 2 is thus fixedly connected to the bearing body 3, and the multi-layer sliding bearing 1 is thus in an operational state.

The connection, as it is shown in FIG. 3, between the carrier body 2 and the bearing body 3 can be applied both in case of a cylindrical multi-layer sliding bearing 1 and in case of a flat multi-layer sliding bearing 1 as it is shown in FIG. 2.

As can be seen from FIG. 3, it is provided that a surface structure 7 is formed on the carrier body connecting surface 5 of the carrier body 2, which surface structure 7 forms a positive locking connection with the bearing body connecting surface 6 of the bearing body 3.

As can be seen from FIG. 3, it may be provided that the surface structure 7 comprises individual webs 8, wherein an undercut 9 is formed between the individual webs 8. During the joining process of the bearing body 3 with the carrier body 2, the material of the bearing body 3 is pressed and/or deformed into the undercut 9, so that the positive locking connection between the carrier body 2 and the bearing body 3 forms.

The individual webs 8 extend, in the viewing direction toward the drawing plane of FIG. 3, in a longitudinal extension of the carrier body 2. In particular, it may be provided that the cutting profile of the multi-layer sliding bearing 1 has a consistent shaping along the longitudinal extension of the carrier body 2.

As can further be seen from FIG. 3, it may be provided that the individual webs 8 each comprise a web head 10 and a web base 11. The web head 10 has a cross-sectional width of the head 12. The web base 11 has a cross-sectional width of the base 13. In particular, it may be provided that the cross-sectional width of the head 12 is greater than the cross-sectional width of the base 13. In other words, the web 8 may be formed so as to taper from the web head 10 to the web base 11.

Figure 4A:
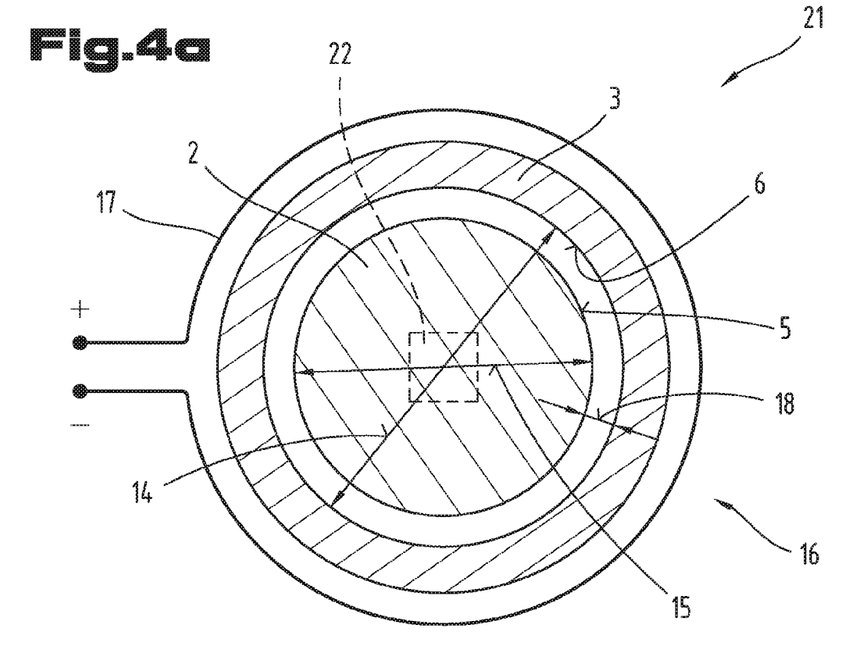
FIGs. 4a and 4b method steps for producing a multi-layer sliding bearing.
Figure 4B:
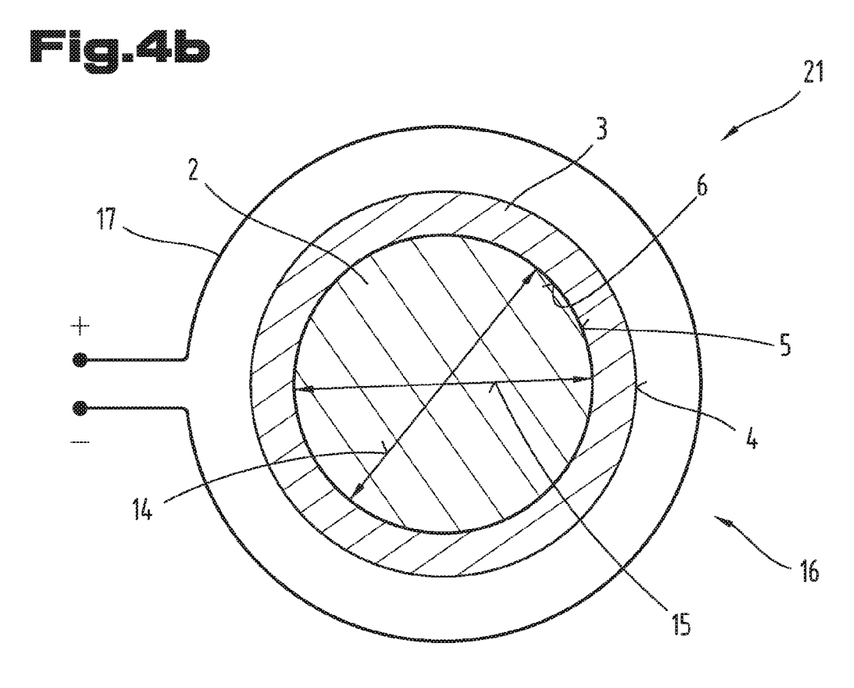

In FIGS. 4a and 4b, a further and possibly independent embodiment of the multi-layer sliding bearing 1 is shown, wherein again equal reference numbers and/or component designations are used for equal parts as in the preceding FIGS. 1 through 3. In order to avoid unnecessary repetitions, it is pointed to/reference is made to the detailed description in FIGS. 1 through 3 preceding it.

FIG. 4a shows a first method step of the course of the method for connecting the carrier body 2 to the bearing body 3. In this first method step, the carrier body 2 and the bearing body 3 are provided. In particular, it may be provided in this regard that the bearing body connecting surface 6 has a diameter 14 in its non-deformed state. The carrier body connecting surface 5 may have a diameter 15. In particular, it may be provided that the diameter 14 of the bearing body connecting surface 6 is greater than the diameter 15 of the carrier body connecting surface 5 so that the bearing body 3 can be easily pushed onto the carrier body 2. The bearing body connecting surface 6 and the carrier body connecting surface 5 are thus arranged at a distance 18 from one another.

Moreover, a sliding bearing production device 21 is provided, which comprises a holding device 22 for holding a carrier body 2 and/or a bearing body 3.

The sliding bearing production device 21 furthermore comprises a magnetic force generator 16, which has a coil 17. In particular, it may be provided that the coil 17 is arranged around the outside of the bearing body 3 in the circumferential direction.

If a current source, in particular an alternating current source or a current source with variable current strength, is applied to the coil 17, a magnetic field is generated by means of the current-carrying conductor. This magnetic field acts on the bearing body 3 as a current flow is induced according to Lenz's rule. Due to this current flow, a so-called Lorentz force acts on the bearing body 3.

The coil 17 is accommodated in a dimensionally stable housing. Thus, the bearing body 3 can be deformed radially inwards by means of the Lorentz force. A bearing body 3 designed as a hollow cylinder, as it is shown in FIG. 4a, is particularly suitable for inducing current.

Due to the deformation of the bearing body 3 by means of the magnetic force, the bearing body 3 can be pressed onto the carrier body 2, so that a firm connection between the carrier body 2 and the bearing body 3 is achieved.

Alternatively, it is of course also conceivable that the bearing body 3 is deformed by means of a conventional press means, for example by means of a hydraulic press or an electrically driven mechanical press.

Here, the firm connection between the carrier body 2 and the bearing body 3 can be achieved by a force fit alone, as can be seen in the representation in FIG. 4b.

Moreover, it is also conceivable that the carrier body connecting surface 5 has the surface structure 7, and during the deforming of the bearing body 3, the bearing body 3 is partially pressed into the undercuts 9 of the carrier body 2. Thus, a positive locking connection can be achieved in addition to the force-fit connection.

Figure 5:
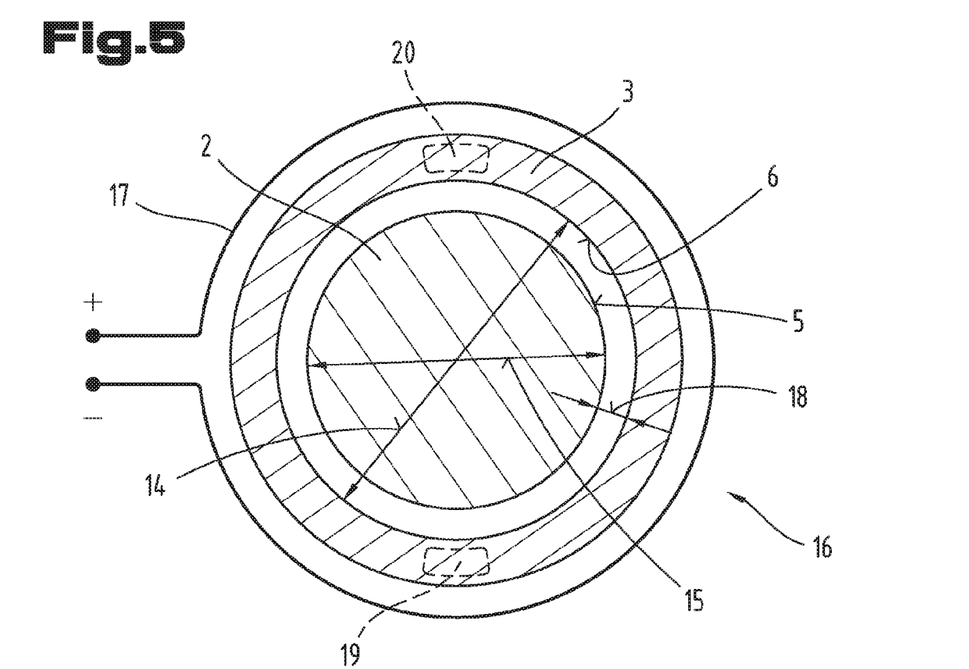
FIG. 5 a further method for producing a multi-layer sliding bearing.

FIG. 5 shows a further and possibly independent course of the method and/or structure for producing a multi-layer sliding bearing 1, wherein again, equal reference numbers/component designations are used for equal parts as before in FIG. 4. In order to avoid unnecessary repetitions, it is pointed to/reference is made to the detailed description in FIG. 4 preceding it.

As can be seen in FIG. 5, it can be provided that a first electrode 19 and a second electrode 20 are arranged on the bearing body 3. The two electrodes 19, 20 may be arranged, for example, so as to be opposite one another on the two different front sides of the bearing body 3. Moreover, it is also conceivable that the two electrodes 19, 20 are arranged diametrically opposed on the same front side of the bearing body 3.

The two electrodes 19, 20 may be short-circuited with one another in order to amplify the force effect on the bearing body 3 in accordance with Lenz's rule. In this embodiment variant, in particular, the current induced in the bearing body 3 by means of the magnetic force of the magnetic force generator 16 is used in an improved manner for generating magnetic force in the bearing body 3, as well.

In an alternative embodiment variant, it is also conceivable that the first electrode 19 and the second electrode 20 are connected to a current source, in particular an alternating current source, in order to amplify the force effect on the bearing body 3.

Figure 6:
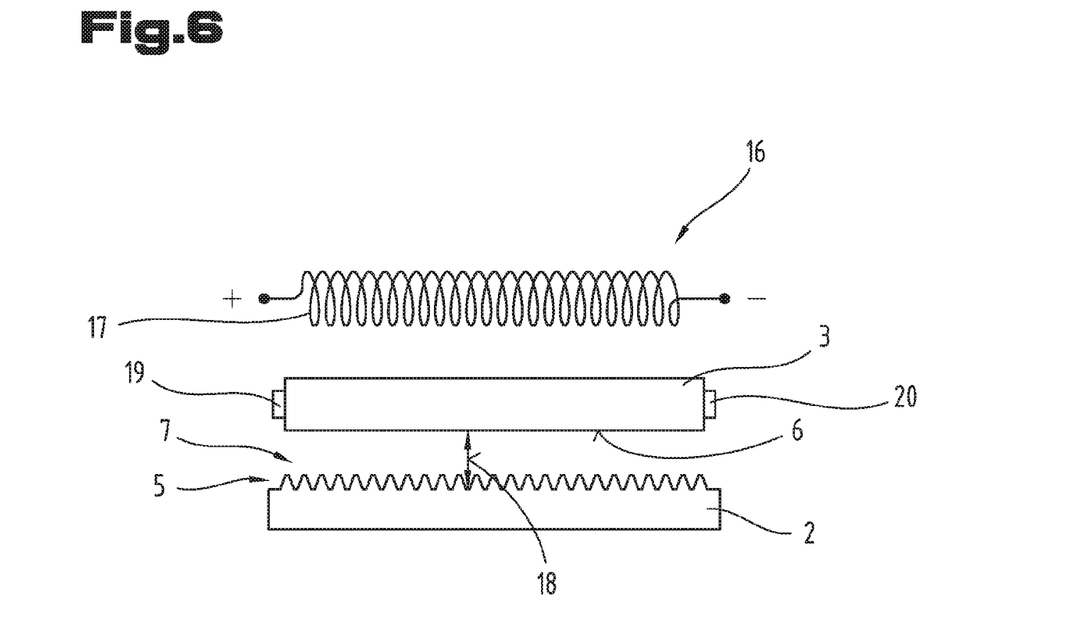
FIG. 6 a method for producing a flat multi-layer sliding bearing.

FIG. 6 shows a further and possibly independent course of the method and/or structure for producing a multi-layer sliding bearing 1, wherein again, equal reference numbers/ component designations are used for equal parts as before in FIG. 4. In order to avoid unnecessary repetitions, it is pointed to/reference is made to the detailed description in FIG. 4 preceding it.

As can be seen from FIG. 6, the same principles described in FIG. 4 can be used here. In particular, it is possible to generate a force effect on the bearing body 3 by means of the magnetic force generator 16, so that it is pressed onto the carrier body 2 and joined therewith.

For the joining process, the bearing body 3 may, as can be seen in FIG. 6, be arranged at a distance 18 from the carrier body 2, so that, by generating a magnetic force, the bearing body 3 can be accelerated towards the carrier body 2.

In a flat arrangement of the bearing body 3 as it is shown in FIG. 6, the bearing body 3 and the carrier body 2 can also be firmly connected to one another without the presence of a surface structure 7. In this process, the collision energy of the bearing body 3 onto the carrier body 2 is utilized to deform the carrier body connecting surface 5 of the carrier body 2 at least in some sections, and to thus establish a materially bonded and/or a positive locking connection between the bearing body 3 and the carrier body 2.

As can further be seen from FIG. 6, it is also possible in this regard that the first electrode 19 and the second electrode 20 are arranged on the bearing body 3 for amplifying the magnetic force, wherein they can either be short-circuited again or be connected to a current source.

Figure 7A:
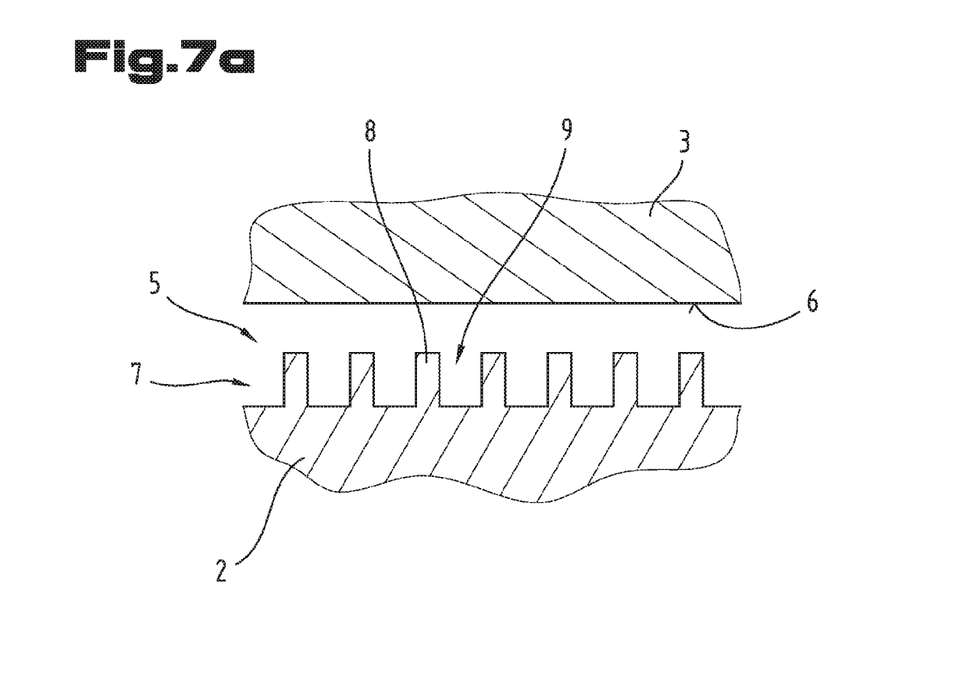
FIGS. 7a and 7b method steps for producing a multi-layer sliding bearing with deformed webs.
Figure 7B:
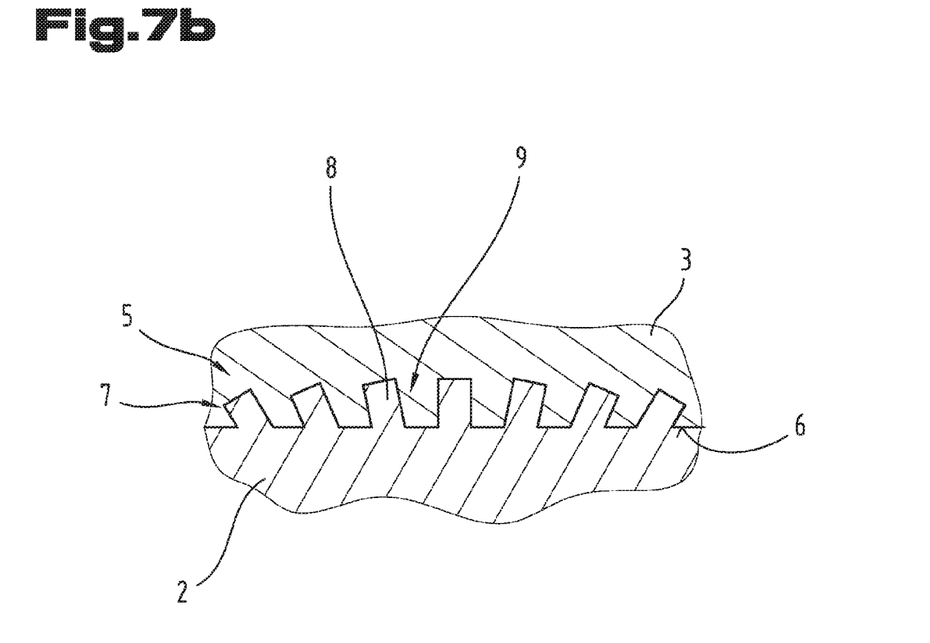

FIGS. 7a and 7b show, in a detailed view, a possible course of the method for joining the bearing body 3 and the carrier body 2. As can be seen from FIG. 7, it may be provided that the bearing body 3 and the carrier body 2 are designed such that the individual webs 8 of the surface structure 7 of the carrier body 2, deform obliquely to their longitudinal extension while the carrier body 2 is pressed onto the bearing body 3, so that this deformation causes a positive locking connection between the carrier body 2 and the bearing body 3. This can be achieved particularly in that, during the joining process between the carrier body 2 and the bearing body 3, the material of the bearing body 3 is laterally displaced obliquely to the joining direction, and thus, the webs 8 of the surface structure 7 of the carrier body 2 are deformed.

In this case, it is not necessary that the individual webs 8 of the carrier body 2 are formed so as to taper from the web head 10 to the web base 11 in order to achieve a positive locking connection.

Figure 8:
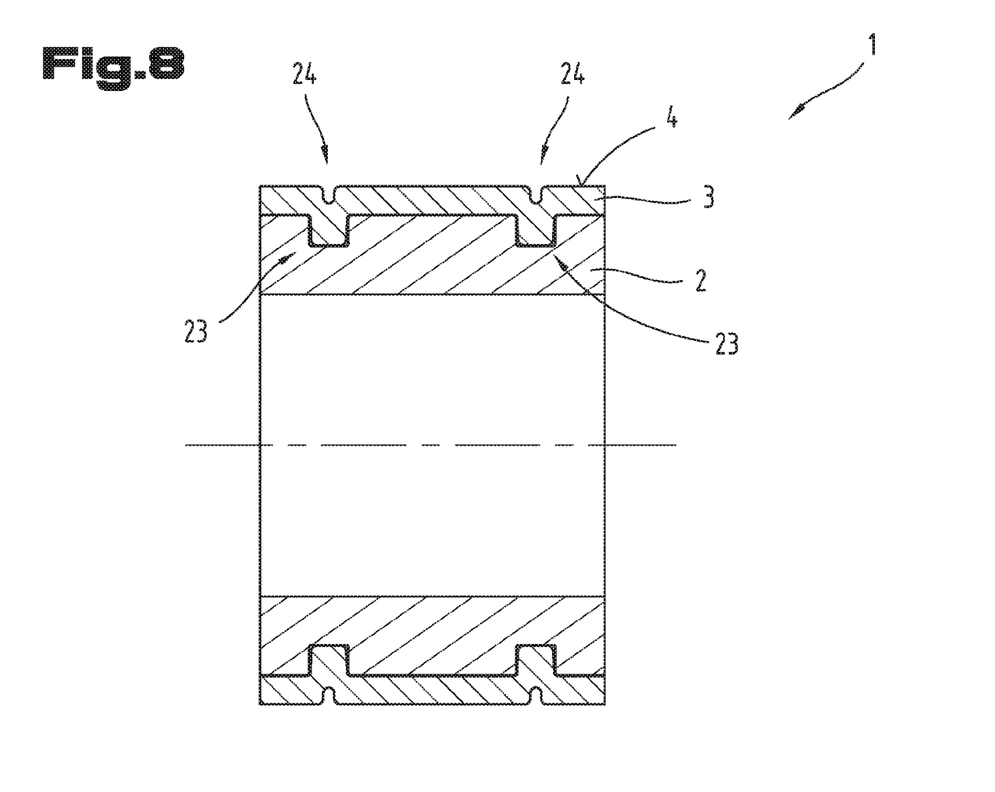
FIG. 8 a cross-sectional view of an exemplary embodiment of a multi-layer sliding bearing with a surface element.

FIG. 8 shows the multi-layer sliding bearing 1 in a sectional view. As can be seen in FIG. 8, it may be provided that the carrier body 2 has a shaped element 23, in the form of a groove, on its carrier body connecting surface 5. When deforming the bearing body 3, it is pressed into the shaped element 23, so that a sliding surface 4 of the bearing body 3 has surface elements 24 fitted to the shaped element 23

Figure 9:
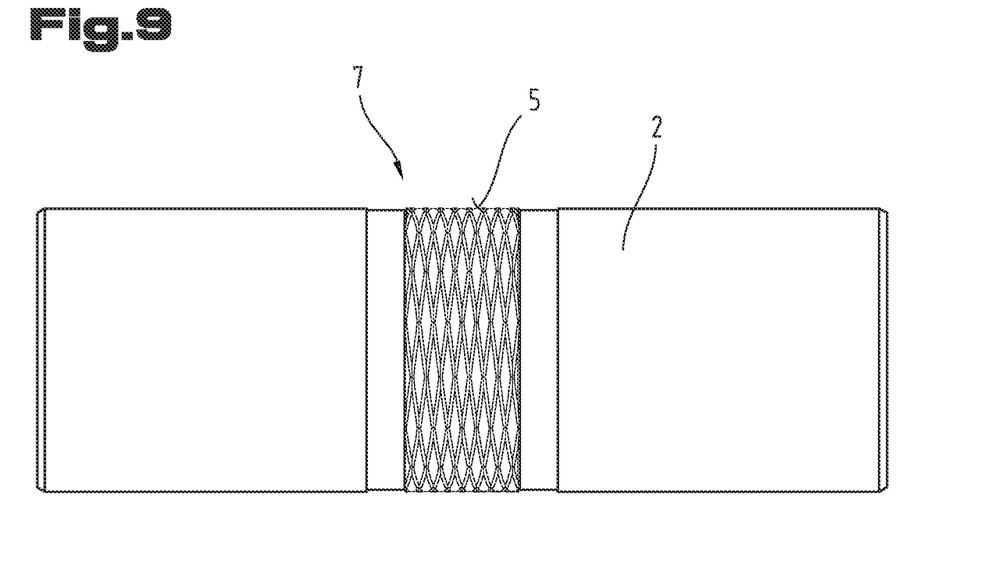
FIG. 9 an exemplary embodiment of a carrier body with a surface structure in the form of a knurling.

FIG. 9 shows an exemplary embodiment of the carrier body 2 with a surface structure 7 in the form of a left-right-hand knurl. The carrier body is designed in the form of a pin, which may be used, for example, for bearing a planetary gear of a planetary gearbox of a wind turbine.

Figure 10:
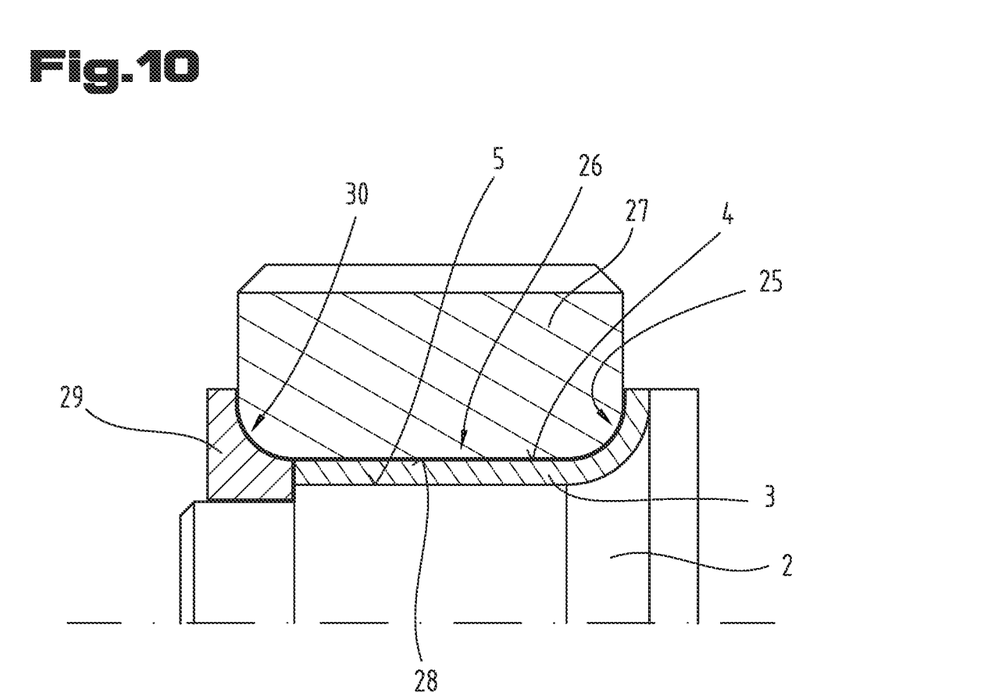
FIG. 10 an exemplary embodiment of a bearing body with an axial bearing region and a radial bearing region.

FIG. 10 shows a partial longitudinal section of a further exemplary embodiment of the carrier body 2, which is designed in the form of a pin, for example a planetary gear pin of a planetary gearbox for a wind turbine. The bearing body 3 is applied to the carrier body 2, wherein the sliding surface 4 of the bearing body 3 has an axial bearing region 25 and a radial bearing region 26. The radial bearing region 26 may be designed cylindrically. The axial bearing region 25 may directly follow the radial bearing region 26.

In particular, it may be provided that, as viewed in a longitudinal section, the axial bearing region 25 is designed to be arcuate, and the radial bearing region 26 has a tangential transition, whereby an improved bearing situation can be achieved.

In an alternative embodiment variant, which is not shown, it may also be provided that the axial bearing region 25, as viewed in the longitudinal section, also forms a straight line, which is arranged at an angle relative to the straight line of the radial bearing region 26. In particular, the axial bearing region 25 may, as viewed in the longitudinal section, be arranged at an angle of 90° relative to the radial bearing section 26. In this regard, it may also be provided that a transitional radius or a transitional chamfer is formed between the axial bearing region 25 and the radial bearing region 26.

As can be seen in FIG. 10, it may be provided that the carrier body connecting surface 5 already defines the shape of the sliding surface 4 and thus of the axial bearing region 25 and of the radial bearing region 26.

As can further be seen in FIG. 10, a planetary gear 27 may be formed, which is rotatably mounted on the bearing body 3. The planetary gear 27 may have a running surface 28 which cooperates with the sliding surface 4. The running surface 28 can therefore also be designed for simultaneous axial bearing and radial bearing.

As can further be seen from FIG. 10, it may be provided that an axial bearing element 29 is formed, which comprises a further axial bearing region 30. By means of the axial bearing element 29, an axial bearing in both axial directions can be achieved.

In particular, it may be provided that, by means of the axial bearing element 29, an axial bearing clearance can be adjusted. For this purpose, it may be provided, for example, that the axial bearing element 29 is arranged on the carrier body 2 by means of a fastening thread in order to achieve the axial adjustability.

For producing the sliding bearing structure according to FIG. 10, it may be provided that in a first method step, the carrier body 2 is provided in the form of a planetary gear pin. In this regard, the carrier body connecting surface 5 may have a cylindrical section, to which a radius connects. Moreover, it may be provided that the carrier body connecting surface 5 has a surface structure in the form of a cross-hatched knurl or a left-right-hand knurl.

In a subsequent method step, the bearing body 3, which is formed as a sleeve, can be axially pushed onto the carrier body 2. In a subsequent method step, the bearing body 3 may be pressed onto the carrier body 2 and thus be connected thereto by means of the magnetic force generator (16).

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Multi-layer sliding bearing
2 Carrier body
3 Bearing body
4 Sliding surface
5 Carrier body connecting surface
6 Bearing body connecting surface
7 Surface structure
8 Web
9 Undercut
10 Web head
11 Web base
12 Cross-sectional width of the head
13 Cross-sectional width of the base
14 Diameter bearing body connecting surface
15 Diameter carrier body connecting surface
16 Magnetic force generator
17 Coil
18 Distance
19 First electrode
20 Second electrode
21 Sliding bearing production device
22 holding device
23 Shaped element
24 Surface element
25 Axial bearing region
26 Radial bearing region
27 Planetary gear
28 Running surface
29 Axial bearing element
30 Further axial bearing region

The invention claimed is:

1. A method for producing a multi-layer sliding bearing, comprising the method steps:
providing a carrier body with a carrier body connecting surface, wherein a surface structure is formed on the carrier body connecting surface, and wherein the carrier body on the carrier body connecting surface has a carrier body material with a carrier body strength;
providing a bearing body with a bearing body connecting surface, wherein the bearing body on the bearing body connecting surface has a bearing body material with a bearing body strength;
arranging the bearing body on the carrier body, wherein the carrier body connecting surface is turned towards the bearing body connecting surface;
pressing the bearing body and the carrier body together, wherein the bearing body, on the bearing body connecting surface, is plastically deformed and forms a positive locking connection with the carrier body connecting surface due to the effect of the surface structure of the carrier body connecting surface,
wherein the surface structure of the carrier body connecting surface is produced in the form of left-right-hand knurls by use of a lathe tool and/or by use of a turning method, wherein a left-hand thread and a right-hand thread are cut into the carrier body connecting surface.

2. The method according to claim 1, wherein the bearing body is produced by use of a casting method.

3. The method according to claim 1, wherein the bearing body and the carrier body are pressed together by use of a magnetic force generator, which applies a magnetic force to the bearing body, wherein the bearing body is pressed onto the carrier body by use of the magnetic force generator.

4. The method according to claim 3, wherein the magnetic force generator comprises a coil admitted with current, wherein an electromagnetic force is applied to the bearing body by use of the coil.

5. A multi-layer sliding bearing comprising:
a carrier body with a carrier body connecting surface, wherein a surface structure is formed on the carrier body connecting surface, and wherein the carrier body on the carrier body connecting surface has a carrier body material with a carrier body strength;
a bearing body with a bearing body connecting surface, wherein the bearing body on the bearing body connecting surface has a bearing body material with a bearing body strength, wherein the bearing body strength is lower than the carrier body strength, wherein the bearing body is applied to the carrier body, wherein the carrier body connecting surface faces the bearing body connecting surface and wherein the bearing body, on the bearing body connecting surface, is plastically deformed into the surface structure of the carrier body connecting surface and forms a positive locking connection with the carrier body connecting surface,
wherein the surface structure of the carrier body connecting surface is produced in the form of left-right-hand knurls by use of a lathe tool and/or by use of a turning method, wherein a left-hand thread and a right-hand thread are cut into the carrier body connecting surface.

6. The multi-layer sliding bearing according to claim 5, wherein on the bearing body, a sliding surface is formed, which has an axial bearing region and a radial bearing region.

7. A method for producing a multi-layer sliding bearing, comprising the method steps:
providing a carrier body with a carrier body connecting surface, wherein a surface structure is formed on the carrier body connecting surface, and wherein the carrier body on the carrier body connecting surface has a carrier body material with a carrier body strength;
providing a bearing body with a bearing body connecting surface, wherein the bearing body on the bearing body connecting surface has a bearing body material with a bearing body strength;
arranging the bearing body on the carrier body, wherein the carrier body connecting surface is turned towards the bearing body connecting surface;
pressing the bearing body and the carrier body together, wherein the bearing body, on the bearing body connecting surface, is plastically deformed and forms a positive locking connection with the carrier body connecting surface due to the effect of the surface structure of the carrier body connecting surface,
wherein the surface structure of the carrier body connecting surface is produced by cross-hatched knurling or left-right-hand knurling.

8. A method for producing a multi-layer sliding bearing, comprising the method steps:
- providing a carrier body with a carrier body connecting surface, wherein a surface structure is formed on the carrier body connecting surface, and wherein the carrier body on the carrier body connecting surface has a carrier body material with a carrier body strength;
- providing a bearing body with a bearing body connecting surface, wherein the bearing body on the bearing body connecting surface has a bearing body material with a bearing body strength;
- arranging the bearing body on the carrier body, wherein the carrier body connecting surface is turned towards the bearing body connecting surface;
- pressing the bearing body and the carrier body together, wherein the bearing body, on the bearing body connecting surface, is plastically deformed and forms a positive locking connection with the carrier body connecting surface due to the effect of the surface structure of the carrier body connecting surface,
- wherein the carrier body has a shaped element, in the form of a groove, on the carrier body connectin surface, wherein when deforming the bearing body, the bearng body is pressed into the shaped element, so that a sliding surface of the bearing body located opposite the bearing body connecting surface has a surface element directed toward to the shaped element.

9. A method for producing a multi-layer sliding bearing, comprising the method steps:
- providing a carrier body with a carrier body connecting surface, wherein a surface structure is formed on the carrier body connecting surface, and wherein the carrier body on the carrier body connecting surface has a carrier body material with a carrier body strength;
- providing a bearing body with a bearing body connecting surface, wherein the bearing body on the bearing body connecting surface has a bearing body material with a bearing body strength;
- arranging the bearing body on the carrier body, wherein the carrier body connecting surface is turned towards the bearing body connecting surface;
- pressing the bearing body and the carrier body together, wherein the bearing body, on the bearing body connecting surface, is plastically deformed and forms a positive locking connection with the carrier body connecting surface due to the effect of the surface structure of the carrier body connecting surface,
- wherein on the bearing body opposite the bearing body connecting surface, a sliding surface is formed, which has an axial bearing region and a radial bearing region.

* * * * *

UNITED STATES PATENT AND TRADEMARK OFFICE
CERTIFICATE OF CORRECTION

PATENT NO. : 12,135,061 B2
APPLICATION NO. : 17/613999
DATED : November 5, 2024
INVENTOR(S) : Johannes Reisenberger et al.

It is certified that error appears in the above-identified patent and that said Letters Patent is hereby corrected as shown below:

In the Claims

In Column 15, Line 22 (Line 22 of Claim 8): change "connectin" to -- connecting --

In Column 16, Line 2 (Line 27 of Claim 8): delete "to"

Signed and Sealed this
Third Day of December, 2024

Katherine Kelly Vidal
*Director of the United States Patent and Trademark Office*